(12) United States Patent
Hemmings

(10) Patent No.: US 11,702,055 B2
(45) Date of Patent: Jul. 18, 2023

(54) CONFIGURATION MODULE

(71) Applicant: KNORR-BREMSE SYSTEME FÜR SCHIENENFAHRZEUGE GMBH, Munich (DE)

(72) Inventor: Mark Hemmings, Melksham (GB)

(73) Assignee: KNORR-BREMSE SYSTEME FÜR SCHIENENFAHRZEUGE GMBH

(*) Notice: Subject to any disclaimer, the term of this patent is extended or adjusted under 35 U.S.C. 154(b) by 63 days.

(21) Appl. No.: 17/275,560

(22) PCT Filed: Sep. 11, 2019

(86) PCT No.: PCT/EP2019/074238
§ 371 (c)(1),
(2) Date: Mar. 11, 2021

(87) PCT Pub. No.: WO2020/053284
PCT Pub. Date: Mar. 19, 2020

(65) Prior Publication Data
US 2022/0105916 A1 Apr. 7, 2022

(30) Foreign Application Priority Data
Sep. 11, 2018 (GB) .................................. 18193587

(51) Int. Cl.
*B60T 13/68* (2006.01)
*B60T 15/02* (2006.01)
(Continued)

(52) U.S. Cl.
CPC .......... *B60T 13/683* (2013.01); *B60T 15/021* (2013.01); *B60T 15/027* (2013.01); *F15D 1/025* (2013.01); *B60T 8/3235* (2013.01)

(58) Field of Classification Search
CPC .... B60T 13/266; B60T 13/365; B60T 13/683; B60T 15/021; B60T 15/027; B60T 8/3235
See application file for complete search history.

(56) References Cited

U.S. PATENT DOCUMENTS 5,967,620 A 10/1999 Truglio et al.
6,024,419 A 2/2000 Waldrop et al.
(Continued)

FOREIGN PATENT DOCUMENTS

| CN | 205186136 U | 4/2016 |
| DE | 102016000760 A1 | 7/2017 |

(Continued)

OTHER PUBLICATIONS

International Search Report and Written Opinion corresponding to PCT/EP2019/074238, dated Oct. 11, 2019.

*Primary Examiner* — Thomas J Williams
(74) *Attorney, Agent, or Firm* — Barnes & Thornburg LLP

(57) ABSTRACT

A brake control valve arrangement includes an electro-pneumatic brake control valve block having a hold valve and a vent valve, a main regulator valve and an emergency and a tare pressure regulator. The valve block has an inlet for a brake supply pressure and an outlet for a brake cylinder, wherein an inlet and a vent pneumatic opening is provided for the hold valve and vent valve. The arrangement also includes a configuration module in pneumatic connection with the brake supply pressure and providing a pneumatic path to the inlet, and a pneumatic path to the vent valve from the brake cylinder, the arrangement also including at least one choke configured to control air flow in pneumatic paths to the inlet opening and vent opening.

18 Claims, 3 Drawing Sheets

(51) Int. Cl.
  *F15D 1/02*  (2006.01)
  *B60T 8/32*  (2006.01)

(56)  References Cited

U.S. PATENT DOCUMENTS

| | | | |
|---|---|---|---|
| 6,086,163 | A | 7/2000 | Klink et al. |
| 10,807,575 | B2 * | 10/2020 | Leonard ................ B60T 13/665 |
| 2002/0180264 | A1 | 12/2002 | Moffitt |
| 2005/0231026 | A1 | 10/2005 | Barberis et al. |
| 2007/0159000 | A1 * | 7/2007 | McLaughlin ......... B60T 13/683 |
| | | | 303/86 |
| 2007/0216223 | A1 | 9/2007 | Schweikert et al. |
| 2015/0307071 | A1 | 10/2015 | Bradley et al. |
| 2018/0079396 | A1 | 3/2018 | Leonard et al. |

FOREIGN PATENT DOCUMENTS

| | | | |
|---|---|---|---|
| EP | 989040 | A2 | 3/2000 |
| EP | 1588913 | A1 | 10/2005 |
| GB | 266579 | A | 3/1927 |
| GB | 875588 | A | 8/1961 |
| GB | 926885 | A | 5/1963 |
| GB | 1334903 | A | 10/1973 |
| JP | 2015514623 | A | 5/2015 |
| WO | 9809857 | A1 | 3/1998 |
| WO | 2013144543 | A2 | 10/2013 |
| WO | 2017021837 | A1 | 2/2017 |
| WO | WO-2019137892 | A1 * | 7/2019 .............. B60T 13/24 |

\* cited by examiner

CONFIGURATION MODULE

CROSS REFERENCE AND PRIORITY CLAIM

This patent application is a U.S. National Phase of International Patent Application No. PCT/EP2019/074238 filed Sep. 11, 2019, which claims priority to European Patent Application No. 18193587.5, the disclosure of which being incorporated herein by reference in their entireties.

FIELD

Disclosed embodiments relate to a configuration module for a valve for use in an electro-pneumatic rail brake system.

BACKGROUND

Rail brake systems are characterized by having a very long service life in comparison to other pneumatic brake systems with production in smaller volumes compared to other vehicles. As many customers for rail brake systems have national or local monopolies, there is often a high degree of individualization of a brake system to meet specific customer requirements. Such individualization causes increased costs, in particular if additional product testing is required.

SUMMARY

Disclosed embodiments provide a brake control valve that is more easily configurable, wherein a brake control valve arrangement includes an electro-pneumatic brake control valve block including a hold valve and a vent valve, a main regulator valve and an emergency and a tare pressure regulator, the valve block having an inlet for a brake supply pressure and an outlet for a brake cylinder, wherein an inlet and a vent pneumatic opening is provided for the hold valve and vent valve, the arrangement further includes a configuration module in pneumatic connection with the brake supply pressure and providing a pneumatic path to the inlet, and a pneumatic path to the vent valve from the brake cylinder, the arrangement further including at least one choke configured to control air flow in pneumatic paths to the inlet opening and vent opening.

BRIEF DESCRIPTION OF FIGURES

Exemplary embodiments are described in great detail with reference to the drawings in which.

DETAILED DESCRIPTION

EP1588913 discloses an electropneumatic brake system having a plate structure in which an intermediate plate acts as a configuration plate so that the valve functionality can be changed during a maintenance overhaul. The configurability permitted by this arrangement is limited and has not been commercially significant.

Disclosed embodiments provide a brake control valve that is more easily configurable, wherein a brake control valve arrangement includes an electro-pneumatic brake control valve block comprising a hold valve and a vent valve, a main regulator valve and an emergency and a tare pressure regulator, the valve block having an inlet for a brake supply pressure and an outlet for a brake cylinder, wherein an inlet and a vent pneumatic opening is provided for the hold valve and vent valve, the arrangement further including a configuration module in pneumatic connection with the brake supply pressure and providing a pneumatic path to the inlet, and a pneumatic path to the vent valve from the brake cylinder, the arrangement further including at least one choke configured to control air flow in pneumatic paths to the inlet opening and vent opening.

Optionally, the choke or chokes are configured to control air flow from the brake supply pressure to the hold valve inlet and to the vent valve. Optionally, the configuration module is further provided with a height adjuster or spacers for configuring at least one of the crush and tare regulators.

Optionally, the outlet of the brake supply pressure on the pneumatic valve unit and the hold valve inlet are substantially co-planar. Optionally, the vent valve inlet is substantially co-planar with the brake supply pressure outlet and hold valve inlet.

Optionally, the pneumatic valve unit controls pressure into two brake cylinders by a pair of hold valves and vent valves. Optionally, a link valve controls air flow between the respective hold and vent valve pairs.

The arrangement of the invention is advantageous in that the main parts of a number of valve designs become interchangeable, which enables earlier commissioning of modifications and also of subsequent changes to settings on an installed or existing valve. It also enables a reduction in the number of parts held in maintenance depots.

Figure 1:
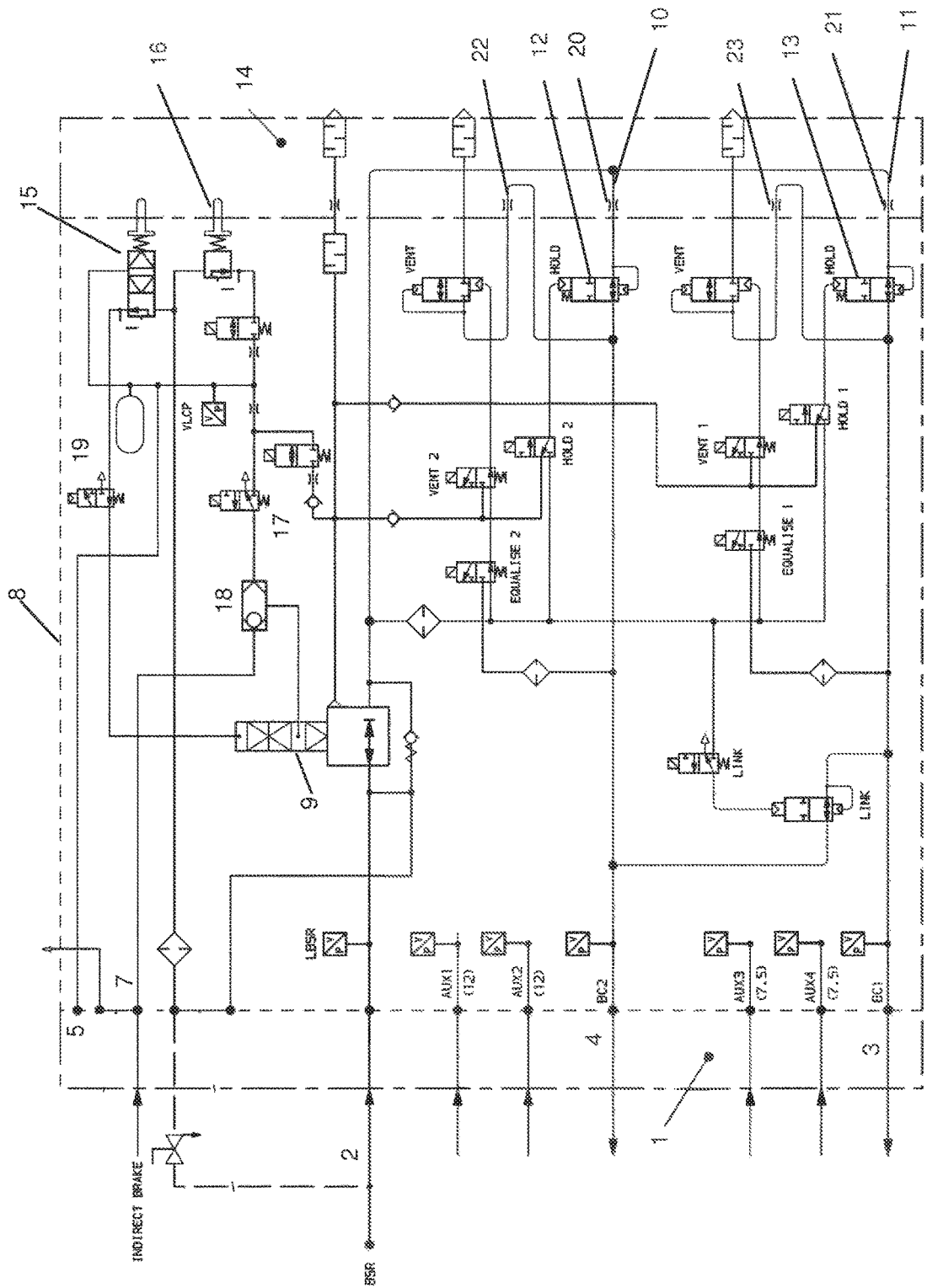
FIG. 1 shows a pneumatic schematic of the brake valve arrangement.

FIG. 1 shows a pneumatic schematic of the brake valve arrangement including a manifold 1 which receives the main brake supply pressure 2 and provides the pneumatic connection to brake cylinders 3, 4. The manifold provides further pneumatic connections from the load weigh connection 5 and the distributor valve 7.

The pneumatic valve unit 8 houses the main relay regulator 9, which receives an inlet pressure from the brake supply pressure 2. The outlet of the main relay regulator 9 is connected to the respective inlets 10, 11 of the control valves 12, 13 via the configuration module 14, described in greater detail below.

The main relay regulator 9 is piloted by pressures from the emergency regulator 15, which provides the tare back up setting level and the crush regulator 16. The tare back up setting is the minimum pressure available in an emergency in the event that the VLCP (variable load control pressure) pressure is less than the tare setting. The crush regulator setting level is the maximum pressure available to the VLCP control valves. The emergency regulator has an inlet from the main supply pressure 2 and an outlet connected to the emergency chamber of the main relay regulator via and emergency solenoid valve.

The crush regulator 16 has an inlet from the main supply pressure 2 and an outlet connected to the control chamber of the main relay regulator via an inlet, vent and remote release solenoid valve 17.

The control valves 12, 13 each comprise an inlet and vent membrane valve controlled by a respective solenoid and a further solenoid arranged to equalise the pressures between the vent membrane control chamber and inlet membrane outlet. The outlets of the control valves 12 and 13 is connected to a respective brake cylinder. A link valve 19 including a membrane valve and solenoid provides a pneumatic connection between the outlets of the respective control valves 12,13.

As described above, the outlet of the main relay regulator 9 is connected to the configuration module 14. The configuration module 14 is provided with a respective choke in the pneumatic path 20,21 from the main relay regulator 9 to the inlet of the respective inlet membrane. The outlet of the inlet membrane is pneumatically connected to the vent membrane via a respective choke 22,23 in the configuration plate 14. The vent membranes are then exhausted via the configuration module.

In use, the wheel slide application and vent time are determined by the size of the choke holes which enable the standard or desired application and release times to be achieved irrespective of the brake cylinder volume. This ensures a predictable wheel slide protection performance.

Figure 2:
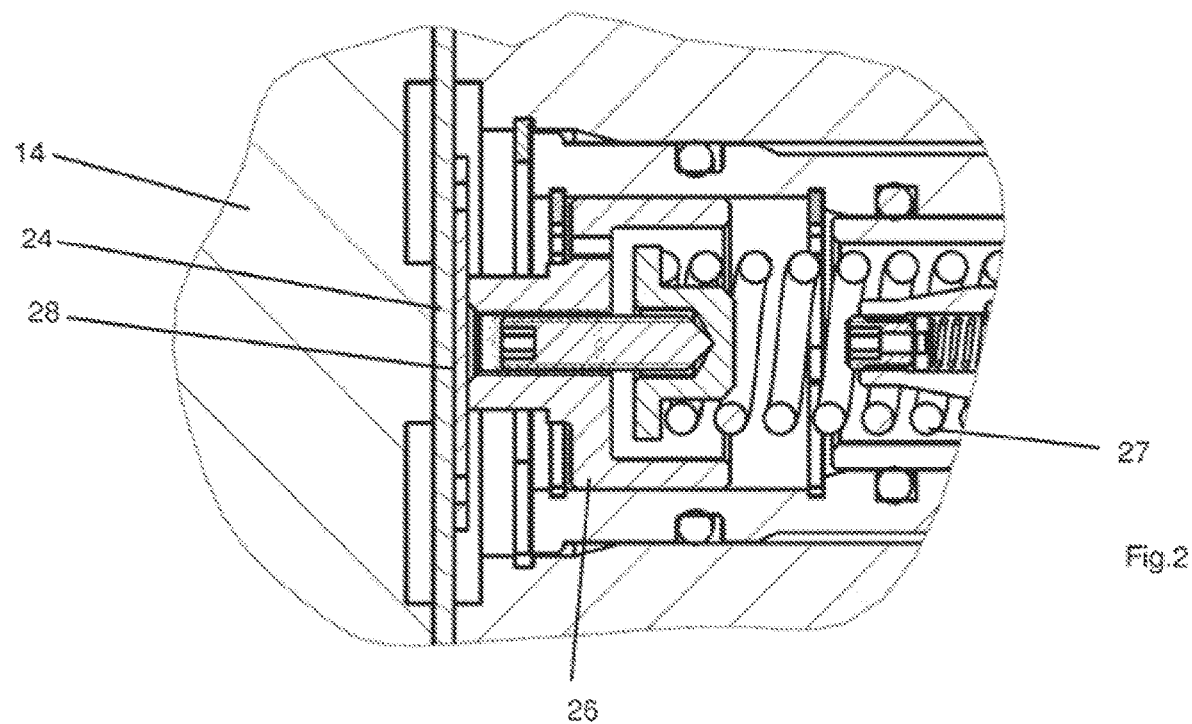
FIG. 2 shows a cross section of a part of the brake valve arrangement.

FIG. 2 shows a cross section of a regulator valve in the pneumatic valve unit 8 with the choke plate 24 sandwiched between or mounted on the configuration module 14. The regulator valve is a plunger type design 26 in which the depression of the plunger alters the height of the compression spring 27, increasing the spring force, thereby determining the pressure regulation level. The height of the plunger can be altered by the use of a height setting disc 28. The height setting disc 28 is retained on the choke plate 24.

The configuration module enables a number of settings to be configurable. The wheel slide protection application and vent times, determined by choke holes 20-23 as the inlet and vent paths are ported into and back out of the configuration module. A choke plate is sandwiched between the pneumatic valve unit 8 and the configuration block to enable standard application and release times to be achieved irrespective of brake cylinder volume. This in turn ensures predictable wheel slide protection performance. The chokes are retained in or on the configuration module.

The configuration module also provides the emergency regulator and Tare back-up setting level—this is the minimum pressure available in Emergency in the event of a variable load control pressure measurement being below the Tare pressure.

The configuration module also provides the crush regulator setting level—this is the maximum pressure available to the VLCP control valves.

Both regulators are of plunger type design in which the depression of the plunger alters the height of a compression spring, increasing the spring force. This determines the pressure regulation level. The configuring or setting of both regulators can be modified using the addition of specific height setting spacers, which are retained on the choke plate or configuration module.

Figure 3:
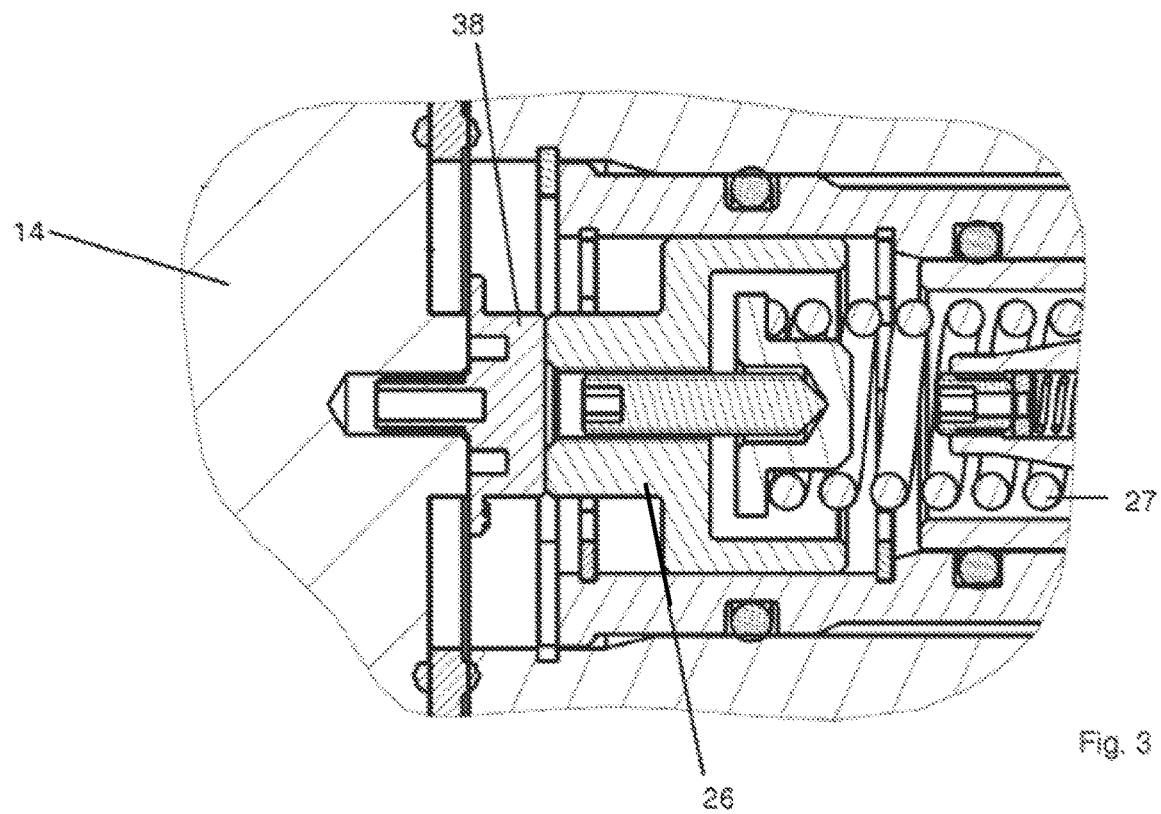
FIG. 3 shows a cross-sectional view of an alternative to FIG. 2.
Figure 4:
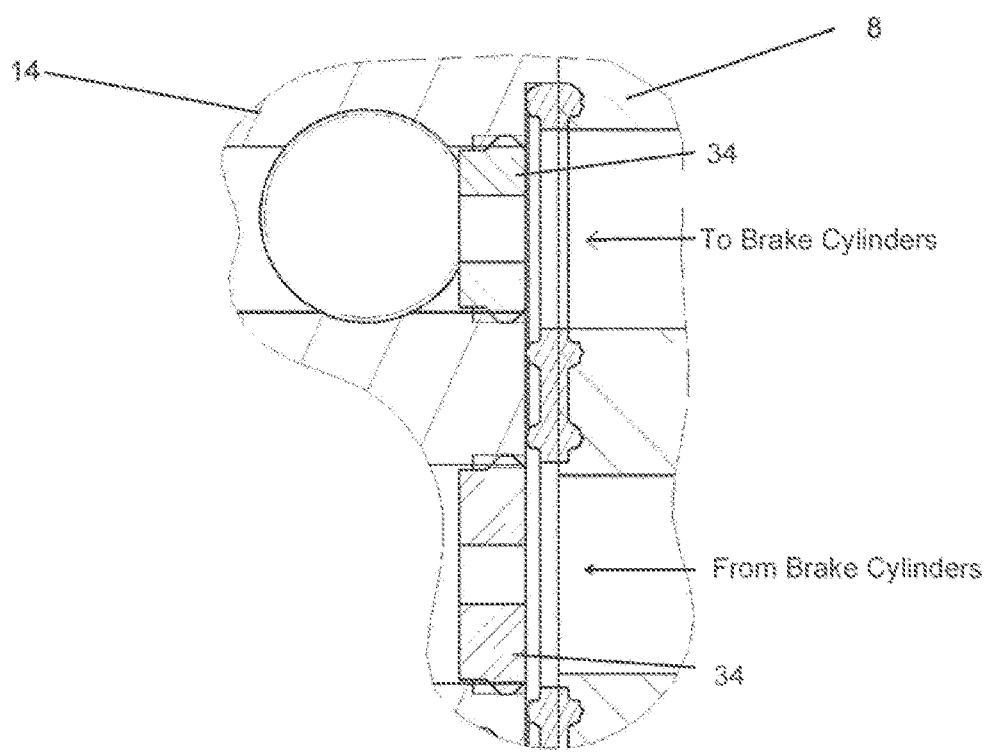
FIG. 4 shows a cross-sectional view of the chokes.

FIGS. 3 and 4 show an alternative to the embodiment of FIG. 2. In the embodiment of FIGS. 3 and 4, hold and vent chokes 34 are screwed into the configuration module 14 rather than being part of a plate structure. The regulator valve is a plunger type design 26 in which the depression of the plunger alters the height of the compression spring 27, increasing the spring force, thereby determining the pressure regulation level. The height of the plunger can be altered by the use of a height setting disc 38. The height setting disc 38 is retained on the configuration module block.

In the embodiment of FIGS. 3 and 4, the chokes are individually selected to enable standard application and release times to be achieved irrespective of brake cylinder volume. This in turn ensures predictable wheel slide protection performance.

The invention claimed is:

1. A brake control valve arrangement comprising:
    an electro-pneumatic brake control valve block that includes a hold valve and a vent valve, a main regulator valve and an emergency and a tare pressure regulator, wherein the valve block has an inlet for a brake supply pressure and an outlet for a brake cylinder, wherein an inlet and a vent pneumatic opening is provided for both the hold valve and vent valve; and
    a configuration module in pneumatic connection with the hold value and providing a pneumatic path to the inlet of the brake pressure supply, and a pneumatic path to the vent valve from the brake cylinder, the arrangement further comprising at least one choke configured to control air flow in pneumatic paths to the inlet of the hold valve and to the vent valve.

2. The brake control valve arrangement of claim 1, wherein the choke or chokes are configured to control air flow from the brake supply pressure to the hold valve and to the vent valve and to control flow of the brake cylinder pressure to the vent valve.

3. The brake control valve arrangement of claim 1, wherein the configuration module further includes a height adjuster that configures at least one of the emergency and tare regulators.

4. The brake control valve arrangement of claim 1, wherein the outlet of the brake supply pressure on the pressure valve unit and the hold valve inlet are substantially co-planar.

5. The brake control valve arrangement claim 4, wherein the vent valve inlet is substantially co-planar with the brake supply pressure outlet and hold valve inlet.

6. The brake control valve arrangement of claim 1, wherein the pneumatic valve unit controls pressure into two brake cylinders by a pair of hold valves and vent valves.

7. The brake control valve arrangement of claim 6, wherein a link valve controls air flow between the respective hold and vent valve pairs.

8. The brake control valve arrangement of claim 1, wherein the choke or chokes are provided by a choke plate arranged between the pneumatic valve block and the configuration module.

9. The brake control valve of claim 1, wherein the choke or chokes are provided in the form of a screw in choke.

10. The brake control valve arrangement of claim 2, wherein the configuration module further includes a height adjuster that configures at least one of the emergency and tare regulators.

11. The brake control valve arrangement of claim 10, wherein the outlet of the brake supply pressure on the pressure valve unit and the hold valve inlet are substantially co-planar.

12. The brake control valve arrangement claim 11, wherein the vent valve inlet is substantially co-planar with the brake supply pressure outlet and hold valve inlet.

13. The brake control valve arrangement of claim 2, wherein the outlet of the brake supply pressure on the pressure valve unit and the hold valve inlet are substantially co-planar.

14. The brake control valve arrangement claim 3, wherein the vent valve inlet is substantially co-planar with the brake supply pressure outlet and hold valve inlet.

15. The brake control valve arrangement of claim 1, wherein the pneumatic valve unit controls pressure into two brake cylinders by a pair of hold valves and vent valves.

16. The brake control valve arrangement of claim 15, wherein a link valve controls air flow between the respective hold and vent valve pairs.

17. The brake control valve arrangement of claim 2, wherein the choke or chokes are provided by a choke plate arranged between the pneumatic valve block and the configuration module.

18. The brake control valve of claim 2, wherein the choke or chokes are provided in the form of a screw in choke.

\* \* \* \* \*